United States Patent [19]

Inoue et al.

[11] Patent Number: 5,236,879
[45] Date of Patent: Aug. 17, 1993

[54] CATALYST FOR PURIFYING EXHAUST GAS

[75] Inventors: Shunji Inoue; Senshi Kasahara; Kazuhiko Sekizawa, all of Shinnanyo, Japan

[73] Assignee: Tosoh Corporation, Shinnanyo, Japan

[21] Appl. No.: 802,859

[22] Filed: Dec. 6, 1991

[30] Foreign Application Priority Data

Dec. 6, 1990 [JP] Japan .................................. 2-405366
Dec. 6, 1990 [JP] Japan .................................. 2-405367

[51] Int. Cl.⁵ .............................................. B01J 29/06
[52] U.S. Cl. ........................................ 502/73; 502/65; 502/66; 502/74
[58] Field of Search ...................... 502/65, 73, 66, 74

[56]  References Cited

U.S. PATENT DOCUMENTS

| 4,952,545 | 8/1990 | Imanari et al. | 502/73 |
| 5,057,473 | 10/1991 | Voecks et al. | 502/73 |

FOREIGN PATENT DOCUMENTS

| 81989/82 | 3/1982 | Australia . | |
| 10071/83 | 1/1983 | Australia . | |
| 25476/84 | 3/1984 | Australia . | |
| 198720 | 10/1986 | European Pat. Off. | 502/65 |
| 0310398 | 4/1989 | European Pat. Off. . | |
| 0373665 | 6/1990 | European Pat. Off. . | |
| 0415410 | 3/1991 | European Pat. Off. . | |
| 2174180 | 10/1973 | France . | |
| 60-125250 | 7/1985 | Japan . | |
| 63-283727 | 11/1988 | Japan . | |

*Primary Examiner*—Carl F. Dees
*Attorney, Agent, or Firm*—Oblon, Spivak, McClelland, Maier & Neustadt

[57] ABSTRACT

A catalyst for purifying an exhaust gas comprising: a crystalline aluminosilicate containing a rare earth or alkaline earth metal produced by allowing a rare earth or alkaline earth metal salt to exist in reactants for a synthesis of a crystalline aluminosilicate, and introduced therein, at least one element selected from the consisting of the group Ib metals and VIII metals of the periodic table.

6 Claims, No Drawings

CATALYST FOR PURIFYING EXHAUST GAS

BACKGROUND OF THE INVENTION

1. Field of the Invention

The present invention relates to a catalyst having an improved heat resistance and durability, to be used in the purification of an exhaust gas discharged from, for example, internal combustion engines of automobiles and the boilers of plants.

2. Description of the Related Art

Various methods of purifying of an exhaust gas discharged from internal combustion engines of automobiles, industrial plants, etc. through the removal of toxic components therein have been studied.

In a conventional method, toxic components of the exhaust gas are brought into contact with a catalyst to remove the toxic components, i.e., a catalytic reduction is one of the means used in the abovementioned method. In this method, it is necessary to use a reducing agent, such as ammonia, hydrogen or carbon monoxide, and further, a special apparatus for recovering or decomposing an unreacted reducing agent. In the catalytic decomposition method, however, toxic components contained in an exhaust gas, particularly nitrogen oxides, can be removed by merely passing the exhaust gas through a catalyst bed without the use of a additional reducing agent, and as the process is simple, the catalytic decomposition method is especially desirable for use in the purification of an exhaust gas. A crystalline aluminosilicate catalyst having an $SiO_2/Al_2O_3$ mole ratio of 20 to 100 and containing a copper ion (see Japanese Unexamined Patent Publication (Kokai) No. 60-125250) has been proposed as a catalyst for use in this process.

In gasoline engines, a lean burn is now considered necessary for a lowering of the fuel consumption and a reduction the amount of exhausted carbon dioxide, but an exhaust gas from this lean burn engine comprises an atmosphere containing an excessive amount of oxygen, and thus it is impossible to apply a conventional three-way catalyst to such an exhaust gas. Accordingly, a method has been proposed of removing toxic components by using a hydrophobic zeolite as the catalyst (see Japanese Unexamined Patent Publication (Kokai) No. 63-283727).

The above-mentioned exhaust gas purification catalyst comprising a crystalline aluminosilicate containing a copper ion, however, has a problem in that the activity is significantly lowered when an operating temperature is high. Namely, an exhaust gas having a high temperature causes a significant lowering of the catalytic activity of a crystalline aluminosilicate containing a copper ion and having an $SiO_2/Al_2O_3$ mole ratio of 20 to 100.

Also in the method of removing toxic components contained in an exhaust gas of a lean burn engine, wherein a hydrophobic zeolite is used, the catalytic activity is significantly lowered when the catalyst comes into contact with an exhaust gas having a high temperature, and thus this method also can not be practically used.

SUMMARY OF THE INVENTION

Accordingly, the objects of the present invention are to solve the above-mentioned problems of the prior and to prevent the lowering in the exhaust gas purification activity of a catalyst for purifying an exhaust gas upon a contact of the catalyst with an exhaust gas having an elevated temperature.

Other objects and advantages of the present invention will be apparent from the following description.

In accordance with the present invention, there is provided a catalyst, for purifying an exhaust gas, comprising: a crystalline aluminosilicate containing a rare earth metal or a crystalline aluminosilicate containing an alkaline earth metal produced by allowing a rare earth metal salt or an alkaline earth metal salt to exist in reactants for a synthesis of a crystalline aluminosilicate; and introduced therein, at least one element selected from the group consisting of the group Ib metals and group VIII metals of the periodic table.

DESCRIPTION OF THE PREFERRED EMBODIMENTS

The present invention will now be described in more detail.

The present inventors have made various studies with a view to solving the problem of the prior art, and as a result, have found that a catalyst comprising a crystalline aluminosilicate containing a rare earth metal or a crystalline aluminosilicate containing an alkaline earth metal produced by allowing a rare earth metal salt or an alkaline earth metal salt to exist in reactants for a synthesis of a crystalline aluminosilicate brings no lowering of the activity of purifying exhaust gas even when brought into contact with an exhaust gas at a high temperature, and thus have completed the present invention.

The crystalline aluminosilicate containing a rare earth metal or the crystalline aluminosilicate containing an alkaline earth metal for the base material of the catalyst of the present invention should be a crystalline aluminosilicate containing a rare earth metal or a crystalline aluminosilicate containing an alkaline earth metal produced by allowing a rare earth metal salt or an alkaline earth metal to exist in reactants for a synthesis of a crystalline aluminosilicate. When the crystalline aluminosilicate is free from the above-mentioned metal, it is impossible to attain the object of the present invention, i.e., to prevent the lowering in the activity of purifying exhaust gas due to the contact of the catalyst with an exhaust gas having an elevated temperature. There is no limitation on the process for producing the crystalline aluminosilicate containing a rare earth metal or the crystalline aluminosilicate containing an alkaline earth metal so far as an rare earth metal or an alkaline earth metal can be introduced into the crystalline aluminosilicate at the time of preparation of reactants for crystal synthesis. For example, the crystalline aluminosilicate containing a rare earth metal or the crystalline aluminosilicate containing an alkaline earth metal can be produced by mixing a silica source, an alumina source and a rare earth metal source or an alkaline earth metal source, and if necessary, an alkali source or a template, with each other, while maintaining the mixture at a temperature in the range of from 60° to 200° C. in an autoclave. Examples of the silica source include sodium silicate, colloidal silica, white carbon and water glass, and examples of the aluminum source include aluminum nitrate, aluminum sulfate, sodium aluminate, aluminum hydroxide and alumina. It is also possible to use an amorphous silica-alumina. The conditions of preparation may be selected depending upon the kind of the intended zeolite.

There is no limitation on the SiO$_2$/Al$_2$O$_3$ mole ratio of the crystalline aluminosilicate of the present invention, as long as the aluminosilicate contains a rare earth metal or an alkaline earth metal, but the mole ratio is preferably 20 or more, more preferably 20 to 200. When the mole ratio is less than 20, the heat resistance is often lowered.

Lanthanum, cerium, praseodyminum, neodymium, promethium, samarium, and europium may be used as the rare earth metal added to reactants for a synthesis of a crystalline aluminosilicate. The particularly preferable rare earth metal is lanthanum or cerium.

Examples of the alkaline earth metal are beryllium, magnesium, calcium, strontium, barium and radium. The particularly preferable alkaline earth metal is barium, calcium, strontium or magnesium.

Examples of the above-mentioned rare earth metal source and alkaline earth metal source are inorganic salts and organic salts of the above-mentioned metals, such as chloride, bromide, carbonate, nitrate, nitrite, acetate, formate, benzoate and tartrate. The particularly preferable metal salt is a nitrate, acetate, or chloride.

The content of the rare earth metal or alkaline earth metal in the exhaust gas purification catalyst of the present invention is preferably 0.05 to 10, more preferably 0.5 to 5, in terms of the atomic ratio of the rare earth metal or alkaline earth metal to aluminum. When the content of the rare earth metal or alkaline earth metal is less than 0.05 per gram atom of aluminum, the required activity of purifying exhaust gas is not easily maintained after the catalyst is brought into contact with an exhaust gas having an elevated temperature. When the content is larger than 10 equivalents, however, a sufficient effect cannot be attained for the content of the rare earth element or alkaline earth metal, and further, the heat resistance of the catalyst is adversely affected.

The crystalline aluminosilicate containing a rare earth metal or the crystalline aluminosilicate containing an alkaline earth metal produced by allowing a rare earth metal salt or an alkaline earth metal to exist in reactants for a synthesis of a crystalline aluminosilicate has a higher heat resistance than the crystalline aluminosilicate containing a rare earth metal or an alkaline earth metal introduced by ion exchange.

The catalyst of the present invention should contain, as a catalytically active component, at least one metallic element selected from the group Ib metals and/or VIII metals, of the periodic table. The metallic element may be in the form of a metal, an ion, an oxide, a complex or the like. Although there is no limitation on the content of the metallic element, the content is preferably 0.05 to 0.8 equivalent, more preferably 0.2 to 0.8, per gram atom of aluminum. When the content of the metallic element is less than 0.05 equivalent per gram atom of aluminum, the toxic components contained in the exhaust gas may not be sufficiently removed, and when the content is more than 0.8 equivalent, the effect is small for the content of the metallic element, and further, the heat resistance of the catalyst may be adversely affected.

The expression "aluminum in the crystalline aluminosilicate" used herein is intended to mean aluminum forming the structure of the crystalline aluminosilicate and includes neither aluminum present in a substance added as a binder or a diluent, such as alumina sol, alumina or silica-alumina, nor an aluminum cation introduced by ion exchange with a cation.

The at least one metallic element selected from the group Ib metals and/or VIII metals of the periodic table can be introduced into the crystalline aluminosilicate containing a rare earth metal or the crystalline aluminosilicate containing an alkaline earth metal by bringing the crystalline aluminosilicate containing a rare earth metal or the crystalline aluminosilicate containing an alkaline earth metal into contact with an aqueous solution or a nonaqueous solution (e.g., an organic solvent) containing the above-described metallic element. In this type of metallic element introduction method, water is an especially preferred medium, from the viewpoint of the operation. It is also possible to use an organic solvent, as long as the organic solvent can ionize the above-mentioned metal. Suitable examples of the solvent are alcohols such as methanol, ethanol and propanol, amides such as dimethylformamide and diacetamide, ethers such as diethyl ether and ketones such as methyl ethyl ketone.

Copper, silver, gold, nickel, palladium, platinum, cobalt, rhodium, iridium, iron, ruthenium and osmium may be used as the metallic element.

Copper, silver, platinum, cobalt, nickel, palladium, etc. are particularly preferable as the metallic element.

Examples of the above-mentioned metallic element source include inorganic salts and organic salt of the above-mentioned metals, such as chloride, bromide, carbonate, sulfate, nitrate, nitrite, sulfide, acetate, formate, benzoate and tartrate of the above-described metals. A nitrate, acetate, or chloride of the metal is particularly preferred.

There is no limitation on the method of introducing the metallic element, and either an ion exchange method or a supporting method may be used. In general, the introduction of the metallic element is introduced by a method into the crystalline aluminosilicate containing a rare earth metal or the crystalline aluminosilicate containing an alkaline earth metal is immersed in a solution containing at least one metallic element selected from the group Ib metals and/or VIII metals, or by a method wherein a solution containing the above-mentioned metallic element is made to flow through a contact column packed with the crystalline aluminosilicate containing a rare earth metal or the crystalline aluminosilicate containing an alkaline earth metal to bring the solution into contact with the aluminosilicate. In the introduction of the metallic element, it is also possible to use an amine complex of the above-described metal.

The concentration of the metallic element in the solution, the amount of the solution, and the contact time, etc., may be selected in accordance with the conditions for introducing a predetermined amount of at least one metallic element selected from the group Ib metals and/or VIII metals in the crystalline aluminosilicate containing a rare earth metal or the crystalline aluminosilicate containing an alkaline earth metal.

After the introduction of the metallic element, the crystalline aluminosilicate containing a rare earth metal or the crystalline aluminosilicate containing an alkaline earth metal is washed, and if necessary, then calcined at a temperature in the range of from 300° to 800° C., preferably from 400° to 700° C.

When the crystalline aluminosilicate containing a rare earth metal or the crystalline aluminosilicate containing an alkaline earth metal after the introduction of the metallic element is calcined, it may be directly calcined. Alternatively, it may be calcined after mold with the use of a natural clay (for example, kaolin, halloysite or montmorillonite) and/or an inorganic oxide (for example, alumina, silica, magnesia, titania, zirconia, hafnia, aluminum phosphate, a binary gel such as silica-alumina, silica-zirconia or silica-magnesia, or a ternary gel such as silica-magnesia-alumina).

To use the catalyst of the present invention for removing toxic components contained in an exhaust gas, it is preferred to mold the catalyst into a form that will provide a large area of contact with the exhaust gas and facilitate the flow of gas, such as a honeycomb form or a monolith catalyst form comprising the catalyst coated on a ceramic or metallic honeycomb structure.

It is also possible to introduce the metallic element after the molding.

The above-mentioned crystalline aluminosilicate containing a rare earth metal or crystalline aluminosilicate containing an alkaline earth metal produced by allowing a rare earth metal salt or an alkaline earth metal to exist in reactants for a synthesis of a crystalline aluminosilicate, the crystalline aluminosilicate further comprising at least one metallic element selected from the group Ib metals and/or VIII metals, is used as a catalyst for purifying an exhaust gas. In this case, there is no limitation on the origin of the exhaust gas, and the exhaust gas may be simply brought into contact with the catalyst. The contact temperature is preferably about 200° to 1000° C., and the contact time is usually 100 to 500,000 $hr^{-1}$, preferably 500 to 200,000 $hr^{-1}$.

In purifying exhaust gases discharged from internal combustion engines of automobiles and boilers of plants, etc., the catalyst according to the present invention can exhibit a high exhaust gas purification activity even after contact with a high temperature exhaust gas.

EXAMPLES

The present invention will now be further illustrated by, but is by no means limited to the following Examples.

Example 1 (Synthesis of crystalline aluminosilicate containing a rare earth metal)

A 13.74 g amount of aluminum nitrate anhydride and 5.79 g of lanthanum acetate were dissolved in 400 g of water. To the solution were added 146.58 g of colloidal silica Cataloid SI-30 (manufactured by Catalysts and Chemicals Industries Co., Ltd.; $SiO_2$: 30.4%; $Na_2O$: 0.38%) and a solution of 6.84 g of sodium hydroxide in 127.04 g of water, while vigorously stirring the solution. Further, 19.5 g of tetrapropyl ammonium bromide was further added thereto, and the stirring was continued for about 15 min to prepare an aqueous gel mixture. The $SiO_2/Al_2O_3$ mole ratio in the starting material mixture was 40.

The aqueous gel mixture was charged into an autoclave having an internal volume of one liter, and crystallization was conducted by stirring the mixture at 160° C. for 16 hr. The product was subjected to solid-liquid separation, washed with water, and dried and calcined in the air at 550° C. for 5 hr to give a La-1 at a crystalline aluminosilicate containing a rare earth metal. The La-1 was subjected to chemical analysis, and as a result, was found to have the following composition represented by mole ratios of oxides on an anhydrous basis:

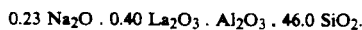

0.23 $Na_2O$ . 0.40 $La_2O_3$ . $Al_2O_3$ . 46.0 $SiO_2$.

The lattice spacing (d value) determined from a powder X-ray diffraction pattern of the La-1 is given in Table 1.

TABLE 1

| Lattice spacing (d value) | Relative intensity |
|---|---|
| 11.1 ± 0.3 | strong |
| 10.0 ± 0.3 | strong |
| 7.4 ± 0.2 | weak |
| 7.1 ± 0.2 | weak |
| 6.3 ± 0.2 | weak |
| 6.04 ± 0.2 | weak |
| 5.56 ± 0.1 | weak |
| 5.01 ± 0.1 | weak |
| 4.60 ± 0.08 | weak |
| 4.25 ± 0.08 | weak |
| 3.85 ± 0.07 | very strong |
| 3.71 ± 0.05 | strong |
| 3.04 ± 0.03 | weak |
| 2.99 ± 0.02 | weak |
| 2.94 ± 0.02 | weak |

Example 2 (Synthesis of crystalline aluminosilicate containing a rare earth metal)

A Ce-1 was prepared in the same manner as that of Example 1, except that the aluminum nitrate anhydride and the sodium hydroxide were used in respective amounts of 6.87 g and 2.39 g and 2.90 g of cerium acetate was used, instead of lanthanum acetate. The zeolite was subjected to chemical analysis, and as a result, was found to have the following composition represented by mole ratios of oxides on an anhydrous basis:

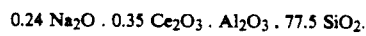

0.24 $Na_2O$ . 0.35 $Ce_2O_3$ . $Al_2O_3$ . 77.5 $SiO_2$.

The lattice spacing (d value) determined from a powder X-ray diffraction pattern of the Ce-1 was fundamentally the same as that given in Table 1.

Example 3 (Preparation of Catalysts for Purifying Exhaust Gas)

A 10 g amount of each of La-1 and Ce-1 respectively prepared in Examples 1 and 2 was weighed and charged into in a 1 mol/liter aqueous ammonium chloride solution weighed so that the number of ammonium molecules was 10 times the number of Al atoms in the zeolite, and the mixture was stirred at a temperature of 60° C. for 2 hr. Then, the mixture was subjected to solid-liquid separation, washed with water, and dried at 100° C. for 10 hr. The dried products were put in a 0.1 mol/liter aqueous copper acetate solution weighed so that the number of copper atoms was 5 times the number of Al atoms in the zeolite, and the mixture was stirred at a temperature of 50° C. for 20 hr. Then, the mixture was subjected to solid-liquid separation, washed with water, and dried at 100° C. for 10 hr. The resultant catalysts were designated respectively as Cu-La-1 and Cu-Ce-1. The catalysts were subjected to a chemical analysis, to determine the copper content ($CuO/Al_2O_3$ mole ratio) of the catalyst for purifying exhaust gas, and the results are given in Table 2.

TABLE 2

| | $CuO/Al_2O_3$ | $MO/Al_2O_3$ |
|---|---|---|
| Cu—La-1 | 0.60 | 0.57 |
| Cu—Ce-1 | 0.62 | 0.55 |

M: La, Ce

Example 4 (Preparation of Catalysts for Purifying Exhaust Gas)

A 10 g amount of each of La-1 and Ce-1 respectively prepared in Examples 1 and 2 was weighed and charged into a 1 mol/liter aqueous ammonium chloride solution weighed so that the number of ammonium molecules was 10 times the number of Al atoms in the zeolite, and the mixture was stirred at a temperature of 60° C. for 2 hr. Then, the mixture was subjected to solid-liquid separation, washed with water, and dried at 100° C. for 10 hr. The dried products were put in a 0.1 mol/liter aqueous cobalt acetate solution weighed so that the number of cobalt atoms was 10 times the number of Al atoms in the zeolite, and the mixture was stirred at a temperature of 80° C. for 20 hr. Then, the mixture was subjected to solid-liquid separation, washed with water, and dried at 100° C. for 10 hr. The resultant catalysts were designated respectively as Co-La-1 and Co-Ce-1. The catalysts were subjected to a chemical analysis, to determine the cobalt content ($CoO/Al_2O_3$ mole ratio) of the catalysts for purifying exhaust gas, and the results are given in Table 3.

TABLE 3

|  | $CoO/Al_2O_3$ | $MO/Al_2O_3$ |
|---|---|---|
| Co—La-1 | 0.99 | 0.45 |
| Co—Ce-1 | 0.95 | 0.47 |

M: La, Ce

Example 5 (Preparation of Catalysts for Purifying Exhaust Gas)

A 10 g amount of each of La-1 and Ce-1 respectively prepared in Examples 1 and 2 was weighed and charged into a 1 mol/liter aqueous ammonium chloride solution weighed so that the number of ammonium molecules was 10 times the number of Al atoms in the zeolite, and the mixture was stirred at a temperature of 60° C. for 2 hr. Then, the mixture was subjected to solid-liquid separation, washed with water, and dried at 100° C. for 10 hr. The dried products were put in a 0.1 mol/liter aqueous nickel acetate solution weighed so that the number of nickel atoms was 10 times the number of Al atoms in the zeolite, and the mixture was stirred at a temperature of 80° C. for 20 hr. Then, the mixture was subjected to solid-liquid separation, washed with water, and dried at 100° C. for 10 hr. The resultant catalysts were designated respectively as Ni-La-1 and Ni-Ce-1. The catalysts were subjected to a chemical analysis, to determine the cobalt content ($NiO/Al_2O_3$ mole ratio) of the catalysts for purifying exhaust gas, and the results are given in Table 4.

TABLE 4

|  | $NiO/Al_2O_3$ | $MO/Al_2O_3$ |
|---|---|---|
| Ni—La-1 | 1.50 | 0.43 |
| Ni—Ce-1 | 1.55 | 0.40 |

M: La, Ce

Example 6 (Preparation of Catalyst for Purifying Exhaust Gas)

A 10 g amount of La-1 prepared in Example 1 was weighed and put in a 1 mol/liter aqueous ammonium chloride solution weighed so that the number of ammonium molecules was 10 times the number of Al atoms in the zeolite, and the mixture was stirred at a temperature of 60° C. for 2 hr. Then, the mixture was subjected to solid-liquid separation, washed with water, and dried at 100° C. for 10 hr. The dried product was charged into a 0.1 mol/liter aqueous silver nitrate solution weighed so that the number of silver atoms was 5 times the number of Al atoms in the zeolite, and the mixture was stirred at a temperature of 80° C. for 20 hr. Then, the mixture was subjected to solid-liquid separation, washed with water, and dried at 100° C. for 10 hr. The resultant catalyst was designated as Ag-La-1. The catalyst was subjected to a chemical analysis, to determine the silver content ($Ag_2O/Al_2O_3$ mole ratio) of the catalyst for purifying exhaust gas, and the results are given in Table 5.

TABLE 5

|  | $Ag_2O/Al_2O_3$ | $LaO/Al_2O_3$ |
|---|---|---|
| Ag—La-1 | 0.50 | 0.60 |

Example 7 (Preparation of Catalyst for Purifying Exhaust Gas)

A 10 g amount of Ce-1 prepared in Example 2 was weighed and put in a 1 mol/liter aqueous ammonium chloride solution weighed so that the number of ammonium molecules was 10 times the number of Al atoms in the zeolite, and the mixture was stirred at a temperature of 60° C. for 2 hr. Then, the mixture was subjected to solid-liquid separation, washed with water, and dried at 00° C. for 10 hr. The dried product was charged into an aqueous solution having a tetraamminepalladium dichloride concentration of 0.1 mol/liter weighed so that the number of palladium atoms was each one time the number of Al atoms in the zeolite, and the mixture was stirred at a temperature of 80° C. for 20 hr. Then, the mixture was subjected to solid-liquid separation, washed with water, and dried at 100° C. for 10 hr. The resultant catalyst was designated as Pd-Ce-1. The catalyst was subjected to chemical analysis, to determine the palladium content ($PdO/Al_2O_3$ mole ratio) of the catalyst for purifying exhaust gas, and the results are given in Table 6.

TABLE 6

|  | $PdO/Al_2O_3$ | $CeO/Al_2O_3$ |
|---|---|---|
| Pd—Ce-1 | 0.80 | 0.40 |

Example 8 (Synthesis of crystalline aluminosilicate containing an alkaline metal)

A Ba-1 was prepared in the same manner as that of Example 1, except that 4.68 g of barium acetate was used instead of lanthanum acetate. The Ba-1 was subjected to a chemical analysis, and as a result, was found to have the following composition represented by mole ratios of oxides on an anhydrous basis:

$0.23\ Na_2O \cdot 0.72\ BaO \cdot Al_2O_3 \cdot 46.8\ SiO_2.$

The lattice spacing (d value) determined from a powder X-ray diffraction pattern of the Ba-1 was basically the same as that given in Table 1.

Example 9 (Synthesis of crystalline aluminosilicate containing an alkaline earth metal)

A Ca-1 was prepared in the same manner as that of Example 1, except that the aluminum nitrate anhydride and the sodium hydroxide were used in respective amounts of 27.48 g and 7.91 g and 5.801 g of calcium acetate was used instead of lanthanum acetate. The Ca-1 was subjected to chemical analysis, and as a result, was found to have the following composition represented by mole ratios of oxides on an anhydrous basis:

0.27 Na$_2$O . 0.65 CaO . Al$_2$O$_3$ . 26.0 SiO$_2$.

The lattice spacing (d value) determined from a powder X-ray diffraction pattern of the Ca-1 was fundamentally the same as that given in Table 1.

Example 10 (Synthesis of crystalline aluminosilicate containing an alkaline earth metal)

A Sr-1 was prepared in the same manner as that of Example 1, except that the aluminum nitrate anhydride and the sodium hydroxide were used in respective amounts of 6.87 g and 2.39 g and 3.77 g of strontium acetate was used instead of lanthanum acetate. The Sr-1 was subjected to a chemical analysis, and as a result, was found to have the following composition represented by mole ratios of oxides on an anhydrous basis:

0.24 Na$_2$O . 0.70 SrO . Al$_2$O$_3$ . 78.5 SiO$_2$.

The lattice spacing (d value) determined from a powder X-ray diffraction pattern of the Sr-1 was fundamentally the same as that given in Table 1.

Example 11 (Synthesis of crystalline aluminosilicate containing an alkaline earth metal)

A Mg-1 was prepared in the same manner as that of Example 1, except that 2.61 g of magnesium acetate was used instead of lanthanum acetate. The Mg-1 was subjected to a chemical analysis, and as a result, was found to have the following composition represented by mole ratios of oxides on an anhydrous basis:

0.25 Na$_2$O . 0.70 MgO . Al$_2$O$_3$ . 47.5 SiO$_2$.

The lattice spacing (d value) determined from a powder X-ray diffraction pattern of the Mg-1 was basically the same as that given in Table 1.

Example 12 (Preparation of Catalysts for Purifying Exhaust Gas)

A 10 g amount of each of Ba-1, Ca-1 and Sr-1 respectively prepared in Examples 8 to 10 was weighed and put in a 1 mol/liter aqueous ammonium chloride solution weighed so that the number of ammonium molecules was 10 times the number of Al atoms in the Ba-1, Ca-1 and Sr-1, and the mixture was stirred at a temperature of 60° C. for 2 hr. Then, the mixture was subjected to solid-liquid separation, washed with water, and dried at 100° C. for 10 hr. The dried products were charged into a 0.1 mol/liter aqueous copper acetate solution weighed so that the number of copper atoms was 5 times the number of Al atoms in the Ba-1, Ca-1 and Sr-1, and the mixture was stirred at a temperature of 50° C. for 20 hr. Then, the mixture was subjected to solid-liquid separation, washed with water, and dried at 100° C. for 10 hr. The resultant catalysts were designated respectively as Cu-Ba-1, Cu-Ca-1 and Cu-Sr-1. The catalysts were subjected to a chemical analysis, to determine the copper content (CuO/Al$_2$O$_3$ mole ratio) of the catalysts for purifying exhaust gas, and the results are given in Table 7.

TABLE 7

|  | CuO/Al$_2$O$_3$ | MO/Al$_2$O$_3$ |
| --- | --- | --- |
| Cu—Ba-1 | 0.70 | 0.47 |
| Cu—Ca-1 | 0.75 | 0.45 |
| Cu—Sr-1 | 0.68 | 0.52 |

M: Ba, Ca, Sr

Example 13 (Preparation of Catalysts for Purifying Exhaust Gas)

A 10 g amount of each of Ba-1, Ca-1 and Sr-1 respectively prepared in Examples 8 to 10 was weighed and put in a 1 mol/liter aqueous ammonium chloride solution weighed so that the number of ammonium molecules was 10 times the number of Al atoms in the Ba-1, Ca-1 and Sr-1, and the mixture was stirred at a temperature of 60° C. for 2 hr. Then, the mixture was subjected to solid-liquid separation, washed with water, and dried at 100° C. for 10 hr. The dried products were charged into a 0.1 mol/liter aqueous cobalt acetate solution weighed so that the number of cobalt atoms was 10 times the number of Al atoms in the Ba-1, Ca-1 and Sr-1, and the mixture was stirred at a temperature of 80° C. for 20 hr. Then, the mixture was subjected to solid-liquid separation, washed with water, and dried at 100° C. for 10 hr. The resultant catalysts were designated respectively as Co-Ba-1, Co-Ca-1 and Co-Sr-1. The catalysts were subjected to a chemical analysis, to determine the cobalt content (CoO/Al$_2$O$_3$ mole ratio) of the catalysts for purifying exhaust gas, and the results are given in Table 8.

TABLE 8

|  | CoO/Al$_2$O$_3$ | MO/Al$_2$O$_3$ |
| --- | --- | --- |
| Co—Ba-1 | 0.93 | 0.49 |
| Co—Ca-1 | 0.95 | 0.47 |
| Co—Sr-1 | 0.95 | 0.55 |

M: Ba, Ca, Sr

Example 14 (Preparation of Catalysts for Purifying Exhaust Gas)

A 10 g amount of each of Ba-1, Ca-1 and Sr-1 respectively prepared in Examples 8 to 10 was weighed and put in a 1 mol/liter aqueous ammonium chloride solution weighed so that the number of ammonium molecules was 10 times the number of Al atoms in the Ba-1, Ca-1 and Sr-1, and the mixture was stirred at a temperature of 60° C. for 2 hr. Then, the mixture was subjected to solid-liquid separation, washed with water, and dried at 100° C. for 10 hr. The dried products were charged into a 0.1 mol/liter aqueous nickel acetate solution weighed so that the number of nickel atoms was 10 times the number of Al atoms in the Ba-1, Ca-1 and Sr-1, and the mixture was stirred at a temperature of 80° C. for 20 hr. Then, the mixture was subjected to solid-liquid separation, washed with water, and dried at 100° C. for 10 hr. The resultant catalysts were designated respectively as Ni-Ba-1, Ni-Ca-1 and Ni-Sr-1. The catalysts were subjected to a chemical analysis, to determine the cobalt content (NiO/Al$_2$O$_3$ mole ratio) of the catalysts for purifying exhaust gas, and the results given in Table 9.

TABLE 9

|  | NiO/Al$_2$O$_3$ | MO/Al$_2$O$_3$ |
| --- | --- | --- |
| Ni—Ba-1 | 1.55 | 0.43 |
| Ni—Ca-1 | 1.59 | 0.40 |

TABLE 9-continued

| | NiO/Al$_2$O$_3$ | MO/Al$_2$O$_3$ |
|---|---|---|
| Ni—Sr-1 | 1.55 | 0.47 |

M: Ba, Ca, Sr

Example 15 (Preparation of Catalyst for Purifying Exhaust Gas)

A 10 g amount of Mg-1 prepared in Example 11 was weighed and put in a 1 mol/liter aqueous ammonium chloride solution weighed so that the number of ammonium molecules was 10 times the number of Al atoms in the Mg-1, and the mixture was stirred at a temperature of 60° C. for 2 hr. Then, the mixture was subjected to solid-liquid separation, washed with water, and dried at 100° C. for 10 hr. The dried product was charged into a 0.1 mol/liter aqueous silver nitrate solution weighed so that the number of silver atoms was 5 times the number of Al atoms in the Mg-1, and the mixture was stirred at a temperature of 80° C. for 20 hr. Then, the mixture was subjected to solid-liquid separation, washed with water, and dried at 100° C. for 10 hr. The resultant catalyst was designated as Ag-Mg-1. The catalyst was subjected to a chemical analysis, to determine the silver content (Ag$_2$O/Al$_2$O$_3$ mole ratio) of the catalyst for purifying exhaust gas, and the results are given in Table 10.

TABLE 10

| | Ag$_2$O/Al$_2$O$_3$ | LaO/Al$_2$O$_3$ |
|---|---|---|
| Ag—Mg-1 | 0.54 | 0.58 |

Example 16 (Preparation of Catalyst for Purifying Exhaust Gas)

A 10 g amount of Mg-1 prepared in Example 11 was weighed and put in a 1 mol/liter aqueous ammonium chloride solution weighed so that the number of ammonium molecules was 10 times the number of Al atoms in the Mg-1, and the mixture was stirred at a temperature of 60° C. for 2 hr. Then, the mixture was subjected to solid-liquid separation, washed with water, and dried at 100° C. for 10 hr. The dried product was charged into an aqueous solution having a tetraamminepalladium dichloride concentration of 0.1 mol/liter weighed so that the number of palladium atoms was each one time the number of Al atoms in the Pd-Mg-1, and the mixture was stirred at a temperature of 80° C. for 20 hr. Then, the mixture was subjected to solid-liquid separation, washed with water and dried at 100° C. for 10 hr. The resultant catalyst was designated as Pd-Mg-1. The catalyst was subjected to a chemical analysis, to determine the palladium content (PdO/Al$_2$O$_3$ mole ratio) of the catalyst for purifying exhaust gas, and the results are given in Table 11.

TABLE 11

| | PdO/Al$_2$O$_3$ | MgO/Al$_2$O$_3$ |
|---|---|---|
| Pd—Mg-1 | 0.37 | 0.36 |

Comparative Example 1 (Synthesis of crystalline aluminosilicate)

A base material Z-1 for a comparative catalyst was prepared in the same manner as that of Example 1, except that lanthanum acetate was not added to the starting materials for synthesis. The zeolite was subjected to chemical analysis, and as a result, was found to have the following composition represented by mole ratios of oxides on an anhydrous basis:

0.65 Na$_2$O . Al$_2$O$_3$ . 45.5 SiO$_2$.

The lattice spacing (d value) determined from a powder X-ray diffraction pattern of the Z-1 was fundamentally the same as that given in Table 1.

Comparative Example 2 (Preparation of Comparative Catalyst)

A comparative catalyst Cu-Z-1 was prepared in the same manner as that of Example 3. The catalyst was subjected to a chemical analysis, to determine the copper content (CuO/Al$_2$O$_3$ mole ratio) of the catalyst for purifying exhaust gas, and the results are given in Table 12.

Comparative Example 3 (Preparation of Comparative Catalyst)

A comparative catalyst Co-Z-1 was prepared in the same manner as that of Example 4. The catalyst was subjected to a chemical analysis, to determine the copper content (CoO/Al$_2$O$_3$ mole ratio) of the catalyst for purifying exhaust gas, and the results are given in Table 12.

Comparative Example 4 (Preparation of Comparative Catalyst)

A comparative catalyst Ni-Z-1 was prepared in the same manner as that of Example 5. The catalyst was subjected to a chemical analysis, to determine the copper content (NiO/Al$_2$O$_3$ mole ratio) of the catalyst for purifying exhaust gas purification catalyst, and the results are given in Table 12.

TABLE 12

| | N—Z-1 |
|---|---|
| CuO/Al$_2$O$_3$ | 0.82 |
| CoO/Al$_2$O$_3$ | 0.94 |
| NiO/Al$_2$O$_3$ | 1.53 |

N: Cu, Co, Ni

Comparative Example 5 (Preparation of Comparative Catalyst)

A comparative catalyst Ag-Z-1 was prepared in the same manner as that of Example 15. The catalyst was subjected to a chemical analysis, to determine the copper content (Ag$_2$O/Al$_2$O$_3$ mole ratio) of the catalyst for purifying exhaust gas, and the results are given in Table 13.

TABLE 13

| | Ag$_2$O/Al$_2$O$_3$ |
|---|---|
| Ag—Z-1 | 0.70 |

Comparative Example 6 (Preparation of Comparative Catalyst)

A comparative catalyst Pt-Pd-Z-1 was prepared in the same manner as that of Example 16. The catalyst was subjected to a chemical analysis, to determine the palladium content (PdO/Al$_2$O$_3$ mole ratio) of the catalyst for purifying exhaust gas, and the results are given in Table 14.

TABLE 14

| | PdO/Al$_2$O$_3$ |
|---|---|
| Pd—Z-1 | 0.85 |

Example 17 (Evaluation of Hydrothermal Stability of Catalysts for Purifying Exhaust Gas)

An atmospheric pressure fixed bed reaction tube was packed with 2 g of each of the catalysts for purifying exhaust gas prepared in Examples 3 to 7 and 12 to 16, and the temperature of the oven was elevated at a rate of 10° C./min up to 900° C. under conditions of a steam concentration of 10% and an air flow rate of 60 ml/min, and maintained at that temperature for 6 hr. The power source was turned off, and the reaction tube, as such, was allowed to stand until cooled to room temperature. The hydrothermal stability was evaluated based on the crystallinity which is represented by the ratio of the peak intensities before the hydrothermal treatment to that after the hydrothermal treatment, in an X-ray diffraction pattern determined by the powder X-ray diffractometry. The results are given in Table 15.

Comparative Example 7 (Evaluation of Hydrothermal Stability of Comparative Catalysts)

The comparative catalysts prepared in Comparative Examples 2 to 6 were treated in the same manner as that of Example 17 and evaluated in the same manner as that of Example 17. The results are given in Table 15.

TABLE 15

| Catalyst | Hydrothermal Stability (Degree of crystallization, %) |
|---|---|
| Cu—La-1 | 75 |
| Cu—Ce-1 | 80 |
| Co—La-1 | 80 |
| Co—Ce-1 | 82 |
| Ni—La-1 | 85 |
| Ni—Ce-1 | 87 |
| Cu—Z-1 | 56 |
| Co—Z-1 | 70 |
| Ni—Z-1 | 75 |
| Cu—Ba-1 | 78 |
| Cu—Ca-1 | 66 |
| Cu—Sr-1 | 83 |
| Co—Ba-1 | 80 |
| Co—Ca-1 | 69 |
| Co—Sr-1 | 85 |
| Ni—Ba-1 | 85 |
| Ni—Ca-1 | 64 |
| Ni—Sr-1 | 91 |
| Cu—Z-1 | 56 |
| Co—Z-1 | 59 |
| Ni—Z-1 | 70 |
| Ag—La-1 | 74 |
| Pd—Ce-1 | 82 |
| Ag—Mg-1 | 76 |
| Pd—Mg-1 | 84 |
| Ag—Z-1 | 55 |
| Pd—Z-1 | 68 |

Example 18 (Evaluation of Durability in Terms of Capability of Purifying Exhaust Gas)

An atmospheric pressure fixed bed reaction tube was packed with 0.65 g of each of the catalyst for purifying exhaust gas prepared in Examples 3 to 7 and 12 to 16, pretreated at 500° C. for 0.5 hr, while passing a reaction gas having the following composition (600 ml/min) through the catalyst bed, and heated to 800° C. at a constant rate, and the NO$_x$ conversions at each temperatures were measured (reaction 1).

| Composition of reaction gas: | |
|---|---|
| NO | 1000 ppm |
| O$_2$ | 4% |
| CO | 1000 ppm |
| C$_3$H$_6$ | 500 ppm |
| H$_2$C | 4% |
| CO$_2$ | 10% |
| N$_2$ | balance |

Subsequently, the reaction tube was maintained at 800° C. for 5 hr for an endurance treatment. After the reaction rube was cooled and maintained at 200° C. for 0.5 hr to conduct a pretreatment, it was again heated to 800° C. at a constant rate to determine the NO$_x$ conversions at each temperatures (reaction 2). The results are given in Tables 16 to 34.

TABLE 16

| Cu—La-1 | NO$_x$ conversion (%) | |
|---|---|---|
| Temp. (°C.) | Reaction 1 | Reaction 2 |
| 300 | 20 | 20 |
| 350 | 33 | 30 |
| 400 | 44 | 42 |
| 450 | 43 | 40 |
| 500 | 35 | 35 |

TABLE 17

| Cu—Ce-1 | NO$_x$ conversion (%) | |
|---|---|---|
| Temp. (°C.) | Reaction 1 | Reaction 2 |
| 300 | 20 | 19 |
| 350 | 34 | 30 |
| 400 | 46 | 45 |
| 450 | 44 | 43 |
| 500 | 35 | 35 |

TABLE 18

| Co—La-1 | NO$_x$ conversion (%) | |
|---|---|---|
| Temp. (°C.) | Reaction 1 | Reaction 2 |
| 300 | 20 | 20 |
| 350 | 28 | 27 |
| 400 | 51 | 49 |
| 450 | 46 | 48 |
| 500 | 35 | 35 |

TABLE 19

| Co—Ce-1 | NO$_x$ conversion (%) | |
|---|---|---|
| Temp. (°C.) | Reaction 1 | Reaction 2 |
| 300 | 20 | 20 |
| 350 | 27 | 27 |
| 400 | 50 | 49 |
| 450 | 46 | 44 |
| 500 | 34 | 32 |

TABLE 20

| Ni—La-1 | NO$_x$ conversion (%) | |
|---|---|---|
| Temp (°C.) | Reaction 1 | Reaction 2 |
| 300 | 20 | 18 |
| 350 | 23 | 20 |
| 400 | 44 | 40 |
| 450 | 40 | 36 |
| 500 | 33 | 30 |

TABLE 21

| Ni—Ce-1 Temp. (°C.) | NO$_x$ conversion (%) | |
|---|---|---|
| | Reaction 1 | Reaction 2 |
| 300 | 19 | 18 |
| 350 | 25 | 24 |
| 400 | 45 | 40 |
| 450 | 41 | 36 |
| 500 | 36 | 34 |

TABLE 22

| Ag—La-1 Temp. (°C.) | NO$_x$ conversion (%) | |
|---|---|---|
| | Reaction 1 | Reaction 2 |
| 300 | 30 | 30 |
| 350 | 44 | 40 |
| 400 | 50 | 48 |
| 450 | 46 | 45 |
| 500 | 35 | 35 |

TABLE 23

| Pd—Ce-1 Temp. (°C.) | NO$_x$ conversion (%) | |
|---|---|---|
| | Reaction 1 | Reaction 2 |
| 300 | 34 | 33 |
| 350 | 38 | 37 |
| 400 | 33 | 30 |
| 450 | 25 | 23 |
| 500 | 19 | 18 |

TABLE 24

| Cu—Ba-1 Temp. (°C.) | NO$_x$ conversion (%) | |
|---|---|---|
| | Reaction 1 | Reaction 2 |
| 300 | 20 | 20 |
| 350 | 35 | 33 |
| 400 | 46 | 46 |
| 450 | 43 | 43 |
| 500 | 27 | 27 |

TABLE 25

| Cu—Ca-1 Temp. (°C.) | NO$_x$ conversion (%) | |
|---|---|---|
| | Reaction 1 | Reaction 2 |
| 300 | 20 | 19 |
| 350 | 34 | 32 |
| 400 | 46 | 45 |
| 450 | 43 | 43 |
| 500 | 27 | 27 |

TABLE 26

| Cu—Sr-1 Temp. (°C.) | NO$_x$ conversion (%) | |
|---|---|---|
| | Reaction 1 | Reaction 2 |
| 300 | 19 | 19 |
| 350 | 34 | 33 |
| 400 | 47 | 45 |
| 450 | 45 | 43 |
| 500 | 28 | 26 |

TABLE 27

| Co—Ba-1 Temp. (°C.) | NO$_x$ conversion (%) | |
|---|---|---|
| | Reaction 1 | Reaction 2 |
| 300 | 21 | 20 |
| 350 | 28 | 30 |
| 400 | 51 | 51 |
| 450 | 46 | 48 |
| 500 | 29 | 30 |

TABLE 28

| Co—Ca-1 Temp. (°C.) | NO$_x$ conversion (%) | |
|---|---|---|
| | Reaction 1 | Reaction 2 |
| 300 | 20 | 20 |
| 350 | 27 | 27 |
| 400 | 50 | 49 |
| 450 | 46 | 47 |
| 500 | 30 | 29 |

TABLE 29

| Co—Sr-1 Temp (°C.) | NO$_x$ conversion (%) | |
|---|---|---|
| | Reaction 1 | Reaction 2 |
| 300 | 18 | 17 |
| 350 | 27 | 26 |
| 400 | 49 | 49 |
| 450 | 44 | 43 |
| 500 | 29 | 27 |

TABLE 30

| Ni—Ba-1 Temp. (°C.) | NO$_x$ conversion (%) | |
|---|---|---|
| | Reaction 1 | Reaction 2 |
| 300 | 20 | 18 |
| 350 | 25 | 24 |
| 400 | 46 | 40 |
| 450 | 40 | 36 |
| 500 | 30 | 27 |

TABLE 31

| Ni—Ca-1 Temp. (°C.) | NO$_x$ conversion (%) | |
|---|---|---|
| | Reaction 1 | Reaction 2 |
| 300 | 19 | 18 |
| 350 | 25 | 26 |
| 400 | 45 | 40 |
| 450 | 41 | 36 |
| 500 | 30 | 28 |

TABLE 32

| Ni—Sr-1 Temp. (°C.) | NO$_x$ conversion (%) | |
|---|---|---|
| | Reaction 1 | Reaction 2 |
| 300 | 19 | 18 |
| 350 | 26 | 27 |
| 400 | 45 | 40 |
| 450 | 42 | 36 |
| 500 | 31 | 29 |

TABLE 33

| Ag—Mg-1 Temp. (°C.) | NO$_x$ conversion (%) | |
|---|---|---|
| | Reaction 1 | Reaction 2 |
| 300 | 30 | 30 |
| 350 | 40 | 37 |
| 400 | 48 | 45 |
| 450 | 43 | 41 |
| 500 | 35 | 35 |

TABLE 34

| Pd—Mg-1 Temp. (°C.) | NO$_x$ conversion (%) | |
|---|---|---|
| | Reaction 1 | Reaction 2 |
| 300 | 35 | 33 |
| 350 | 40 | 38 |
| 400 | 32 | 31 |
| 450 | 25 | 24 |
| 500 | 20 | 20 |

The NO$_x$ conversion is represented by the following equation:

$$\text{No}_x \text{ conversion (\%)} = \frac{\text{NO}_{x(in)} - \text{NO}_{x(out)}}{\text{NO}_{x(in)}} \times 100$$

$\text{NO}_{x(in)}$: $\text{NO}_x$ concentration at inlet of fixed bed type reactor tube $\text{NO}_{x(out)}$: $\text{NO}_x$ concentration at outlet of fixed bed type reactor tube

Comparative Example 8 (Evaluation of Durability of Comparative Catalysts in Terms of Capability of Purifying Exhaust Gas( The comparative catalysts prepared in Comparative Examples 2 to 6 were evaluated in the same manner as that of Example 18, and the results are given in Tables 35 to 39.

TABLE 35

| Cu—Z-1 | $\text{NO}_x$ conversion (%) | |
| --- | --- | --- |
| Temp. (°C.) | Reaction 1 | Reaction 2 |
| 300 | 30 | 15 |
| 350 | 38 | 26 |
| 400 | 50 | 30 |
| 450 | 48 | 36 |
| 500 | 35 | 29 |

TABLE 36

| Co—Z-1 | $\text{NO}_x$ conversion (%) | |
| --- | --- | --- |
| Temp. (°C.) | Reaction 1 | Reaction 2 |
| 300 | 27 | 15 |
| 350 | 46 | 29 |
| 400 | 51 | 32 |
| 450 | 40 | 38 |
| 500 | 30 | 32 |

TABLE 37

| Ni—Z-1 | $\text{NO}_x$ conversion (%) | |
| --- | --- | --- |
| Temp. (°C.) | Reaction 1 | Reaction 2 |
| 300 | 24 | 12 |
| 350 | 40 | 27 |
| 400 | 46 | 30 |
| 450 | 38 | 34 |
| 500 | 29 | 20 |

TABLE 38

| Az—Z-1 | $\text{NO}_x$ conversion (%) | |
| --- | --- | --- |
| Temp. (°C.) | Reaction 1 | Reaction 2 |
| 300 | 30 | 25 |
| 350 | 38 | 30 |
| 400 | 53 | 40 |
| 450 | 48 | 35 |
| 500 | 38 | 30 |

TABLE 39

| Pd—Z-1 | $\text{NO}_x$ conversion (%) | |
| --- | --- | --- |
| Temp. (°C.) | Reaction 1 | Reaction 2 |
| 300 | 35 | 5 |
| 350 | 42 | 15 |
| 400 | 30 | 17 |
| 450 | 23 | 20 |

TABLE 39-continued

| Pd—Z-1 | $\text{NO}_x$ conversion (%) | |
| --- | --- | --- |
| Temp. (°C.) | Reaction 1 | Reaction 2 |
| 500 | 17 | 18 |

As apparent from Tables 16 to 39, the catalysts for purifying exhaust gas comprising a crystalline aluminosilicate, containing a rare earth metal, and the catalysts for purifying exhaust gas comprising a crystalline aluminosilicate containing an alkaline earth metal according to the present invention, are less liable to cause a lowering in the activity of purifying exhaust gas than the comparative catalysts, even when the catalysts for purifying exhaust gas are exposed in a reaction gas at 800° C. for 5 hr. Namely, the catalysts of the present invention have an improved durability.

As mentioned above, in the present invention, the catalyst for purifying exhaust gas according to the present invention comprising a crystalline aluminosilicate containing a rare earth metal or a crystalline aluminosilicate containing an alkaline earth metal produced by allowing a rare earth metal salt or an alkaline earth metal to exist in reactants for a synthesis of a crystalline aluminosilicate and introduced therein, at least one element selected from the group Ib metals and/or VIII metals of the periodic table, can advantageously purify an exhaust gas and maintain a high activity of purifying exhaust gas even after contact with an exhaust gas at a high temperature.

We claim:

1. A catalyst for purifying an exhaust gas comprising: a crystalline aluminosilicate having an $SiO_2/Al_2O_3$ mole ratio of 20 or more, containing a rare earth metal, wherein the content of the rare earth metal ranges from 0.05–10 in terms of the atomic ratio of the rare earth metal to aluminum, prepared by including a rare earth metal salt among the reactants which react to synthesize the crystalline aluminosilicate; and, introducing in the crystalline aluminosilicate obtained, at least one element selected from the group consisting of the Group Ib and Group VIII metals of the Periodic Table.

2. A catalyst for purifying an exhaust gas as claimed in claim 1, wherein said rare earth metal is lanthanum or cerium.

3. A catalyst for purifying an exhaust gas as claimed in claim 1, wherein the group Ib metals and VIII metals of the periodic table are copper, silver, platinum, cobalt, nickel and palladium.

4. A catalyst for purifying an exhaust gas comprising: a crystalline aluminosilicate having an $SiO_2/Al_2O_3$ mole ratio of 20 or more, containing an alkaline earth metal, wherein the content of the alkaline earth metal ranges from 0.05–10 in terms of the atomic ratio of the alkaline earth metal to aluminum, prepared by including an alkaline earth metal salt among the reactants which react to synthesize the crystalline aluminosilicate; and, introducing in the crystalline aluminosilicate, at least one element selected from the group consisting of the Group Ib and Group VIII metals of the Periodic Table.

5. A catalyst for purifying an exhaust gas as claimed in claim 4, wherein said alkaline earth metal is barium, calcium, strontium or magnesium.

6. A catalyst for purifying an exhaust gas as claimed in claim 4, wherein the group Ib metals and VIII metals of the periodic table are copper, silver, platinum, cobalt, nickel and palladium.

* * * * *